Dec. 20, 1932.  G. POIRIER  1,891,576
REVERSE GEAR FOR CYCLES
Filed Nov. 20, 1930

Inventor:
Georges Poirier

Patented Dec. 20, 1932

1,891,576

UNITED STATES PATENT OFFICE

GEORGES POIRIER, OF ST.-SYMPHORIEN, FRANCE

REVERSE GEAR FOR CYCLES

Application filed November 20, 1930, Serial No. 496,987, and in France November 28, 1929.

The present invention relates to free-wheel cycles of the type in which a reverse gear is useful: tricycles, cars for maimed persons, and the like.

This invention concerns a reverse gear located in the ordinary hub and using the backpedal brake existing generally in this hub. For this purpose the member on which the brake cheek or cheeks are pivoted is retained relatively to the fork of the cycle by means of a ratchet gear which prevents its forward motion, but allows its rotation in the backward direction with a certain friction. That friction does not interfere with the backward motion, but it is sufficient to provide, in the forward motion, the fulcrum which is necessary for allowing the operation of the brake.

The annexed drawing represents, by way of example, a form of execution of an ordinary hub provided with a device according to the invention.

Figure 1:
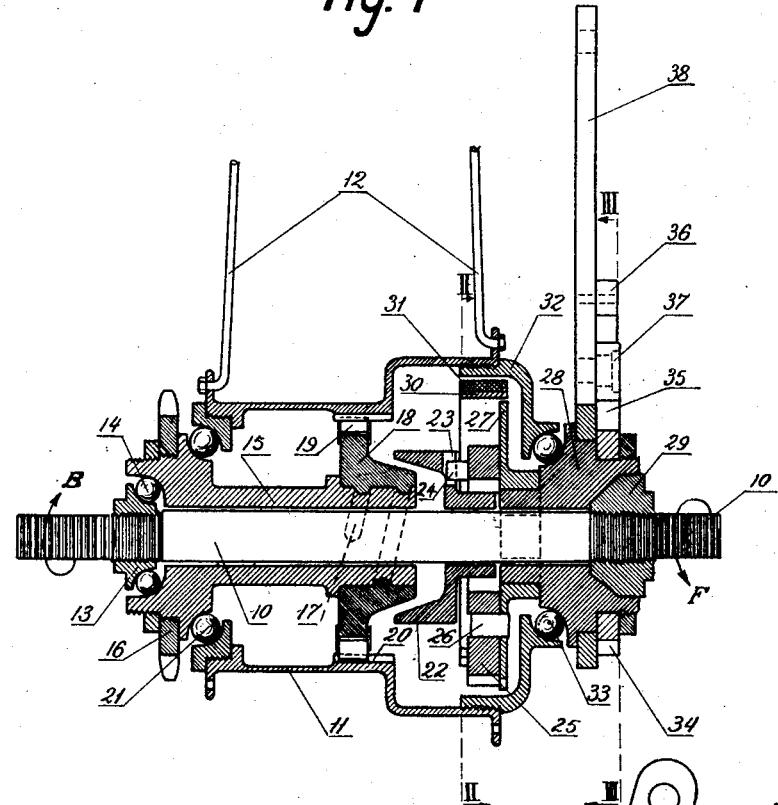
Fig. 1 is longitudinal section of the hub.

On the drawing, 10 represents the stationary shaft of the hub 11 of the cycle, this shaft is secured on a fork (not represented) belonging to the frame of the cycle. The spokes of the driving wheel 12 are attached on the said hub. On shaft 10 a ring 13 is screwed, and this ring supports by means of balls 14 a sleeve 15 at the end of which is secured a toothed pinion 16 bearing the driving chain (not represented).

On the sleeve 15 is mounted, by means of a thread 17 having a large pitch a conical member 18 which presents on its periphery pawls 19 engaging a toothed ring 20 in hub 11, this latter resting through a ball-bearing 21 on the sleeve 15.

The pawls 19 and the ball-bearing 21 constitute a freewheel mechanism, and allow a forward motion of the wheel 12 relatively to the sleeve 15 and the pinion 16.

The forward direction is shown by an arrow F and the backward direction is shown by an arrow B.

The conical part of member 18 constitutes the projecting member of a clutch whose hollow member is formed by a conical cup 22 which retains in a suitable recess 23 a stud 24 on a lever 25 swinging about a shaft 26 on a plate 27. This latter is, owing to a quadrangular coupling, solid on a rim 28 resting on a centering ring 29 fixed on shaft 10.

Figure 2:
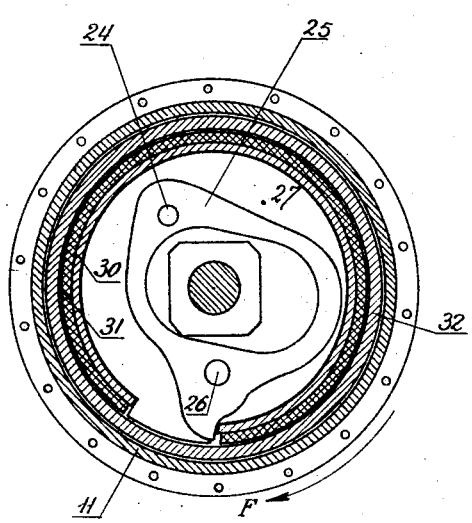
Fig. 2 is a section of the brake on the line II—II of Fig. 1.

As shown in Fig. 2, the lever 25 acts by its shorter arms on the end of an extensible cheek 30, retained by its other end on the plate 27, and provided with a packing 31 opposite the internal face of a drum 32, secured on the hub 11, and resting by means of balls 33 on the rim 28.

Figure 3:
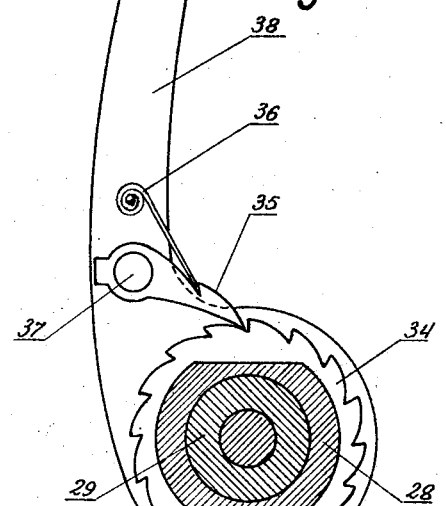
Fig. 3 is a sectional view of the ratchet gear on the line III—III of Fig. 1.

The disposition of the members hereinbefore described is well-known, but in conformity with the present invention the rim 28 carries, fixed thereto, a ratchet wheel 34 cooperating with a pawl 35 (Fig. 3) pushed by a spring 36 and mounted by means of a shaft 37 on an arm 38 secured to the cycle fork (not shown).

The arm 38 presents a circular enlargement surrounding the rim 28. Besides, this rim 28 is tightly fitted on the centering ring 29 in such a manner that the rim 28 is able to rotate with a certain friction in the direction B. The rotation of the rim 28 in the direction F is prevented by the toothed ring 34 engaging with the retaining pawl 35.

The hub hereinbefore described operates as follows:

Assuming that the driver causes the toothed wheel 16 to turn in the direction of the arrow F, the conical member 18 is checked in its back position and its motion is transmitted by the pawls 19 to the hub 11 and the wheel rotates in forward direction.

If the driver checks the pinion 16, the pawls 19 allow nevertheless the forward rotation of the wheel. While the wheel 12 rotates forward, if the driver causes the pinion 16 to rotate backward (arrow B), the conical member 18 is moved on the thread 17, up to reach the hollow member 22, and this latter rotating in the backward direction causes the lever 25 to swing a little about the shaft 26 and to open the cheek 30 of the brake.

As said before, the motion of the lever 25 is possible, because the rim 28 the plate 27 and consequently the shaft 26 are retained by the friction exerted by the ring 29. That friction is increased by the axial thrust of the conical member 18 towards the said ring 29. Therefore the cheek 30 leans against the drum 32, and the wheel 12 of the cycle is braked.

The wheel 12 being stationary, if the driver causes the pinion 16 to rotate in the backward direction (arrow B) the brake is tightened as said before, but if the driver pursues his effort, he pushes in the backward direction the hub 11 by means of the cheek 30 and of the drum 32. This backward motion is allowed by the fact that the cup 22 is free to rotate in the backward direction, owing to the pawl 35.

The hub hereinbefore described comprises a free wheel, a back-pedal brake and a reverse device. It is suitable for tricycles where, up to this time, the free wheel prevented the backward motion.

It is evident that the invention is not restricted to the example described, and any type of hub with back-pedal brake could be used. Besides, the ratchet gear comprising the wheel 34 and the ring 29 could be replaced by any other type of ratchet preventing the rotation in a direction and allowing the rotation in the contrary direction with a certain friction.

I claim:

1. In a transmission system for hand-propelled or foot-propelled vehicles, a movable hub, a shaft stationary with respect to the vehicle, a sleeve turning freely on the shaft, a driving pinion carried by the sleeve, a back-pedal brake, a coupling device carried by the sleeve and cooperating with the movable portion of the back-pedal brake, the back-pedal brake comprising a cheek which acts on the hub, a rim carrying the cheek of the back-pedal brake, said rim having the hub rotatively mounted thereon, and means for rendering the rim stationary with respect to the vehicle when the latter is moving in a forward direction, said means comprising a ratchet mechanism, one of the members of the ratchet mechanism being carried by the rim, the other member of the ratchet mechanism being carried by a member integral with the vehicle, the rim frictionally engaging the member integral with the vehicle.

2. The device set forth in claim 1, in which the rim which carries the cheek of the back-pedal brake is tightly fitted on a centering ring fixed to the shaft.

3. The device set forth in claim 1, in which the rim which carries the cheek of the back-pedal brake is tightly fitted on a centering ring fixed to the shaft, said ring having a conical form.

In testimony whereof, I affix my signature.

GEORGES POIRIER.